May 7, 1968 J. O. FUNDINGSLAND 3,381,910

TAPE CARTRIDGE PLAYER

Filed Aug. 3, 1965 5 Sheets-Sheet 1

INVENTOR
JOHN O. FUNDINGSLAND
BY
Richard W. Hanson
ATTORNEY

TAPE CARTRIDGE PLAYER

Filed Aug. 3, 1965 5 Sheets-Sheet 2

INVENTOR.
JOHN O. FUNDINGSLAND
BY
ATTORNEY

May 7, 1968 J. O. FUNDINGSLAND 3,381,910

TAPE CARTRIDGE PLAYER

Filed Aug. 3, 1965 5 Sheets-Sheet 3

INVENTOR.
JOHN O. FUNDINGSLAND
BY

ATTORNEY

INVENTOR.
JOHN O. FUNDINGSLAND
BY Richard W. Hanson
ATTORNEY

INVENTOR.

BY JOHN O. FUNDINGSLAND

Richard W. Hanson

ATTORNEY

United States Patent Office 3,381,910
Patented May 7, 1968

3,381,910

TAPE CARTRIDGE PLAYER

John O. Fundingsland, 1126 N. Sheridan Ave., Colorado Springs, Colo. 80909

Filed Aug. 3, 1965, Ser. No. 476,792
6 Claims. (Cl. 242—55.13)

ABSTRACT OF THE DISCLOSURE

A tape cartridge player having seats for the cartridges and a two speed over-head tape drive capstan with a switch responsive to longitudinal position of the cartridge in the seat to actuate the capstan and an inclined plane in the seat to elevate the cartridge into playing engagement with the capstan.

The present invention relates generally to sound recording and reproducing equipment of the magnetic tape variety, and more specifically, to apparatus for selectively or sequentially recording or playing a given one of a plurality of tapes which are housed in cartridges or magazines. In effect, the apparatus is the tape cartridge counterpart of record changers except that the present device is not limited to sequentially playing a number of selections which may be placed on the machine.

The tape cartridge to which reference will be made is disclosed in copending United States patent application Ser. No. 412,679, to which reference is hereby made and its contents are incorporated herein to the extent necessary to fully understand the instant invention.

The fundamental concept of the present invention stems from the fact that the spindles of the tape supply and take-up spools in the aforementioned cartridge are independent of any drive mechanism exterior of the cartridge housing. The spools are both driven through a single connection to an outside source and that connection is the capstan drive of the magnetic tape. The simplicity of applying only a capstan drive to one or more cartridges, either singly or simultaneously, eliminates the restrictions and limitations of the prior art that have been manifested by the necessity of providing mechanical driving and braking force to the spindles of the tape spools, whether in cartridge form or in the more conventional reel-to-reel design.

In summary, the present invention in a tape cartridge "changer" comprises a tray or rack in which a plurality of tape cartridges may be stacked side by side and over which is mounted a power driven rotatable capstan and at least one magnetic "head." By appropriate mechanical means, the capstan may be made to contact the tap of any cartridge and move it relative to the head for playback or recording purposes.

The disclosure will be directed to a first embodiment having a fixed motor which drives an elongated capstan extending lengthwise over all of the cartridges in the rack and to a second embodiment where the motor, capstan and magnetic heads are movable as a unit so as to be selectively positioned over the tape cartridge to be operated. A more detailed description of the preferred and secondary embodiments will be set forth in connection with the accompanying drawings in which.

Figures 1, 2:
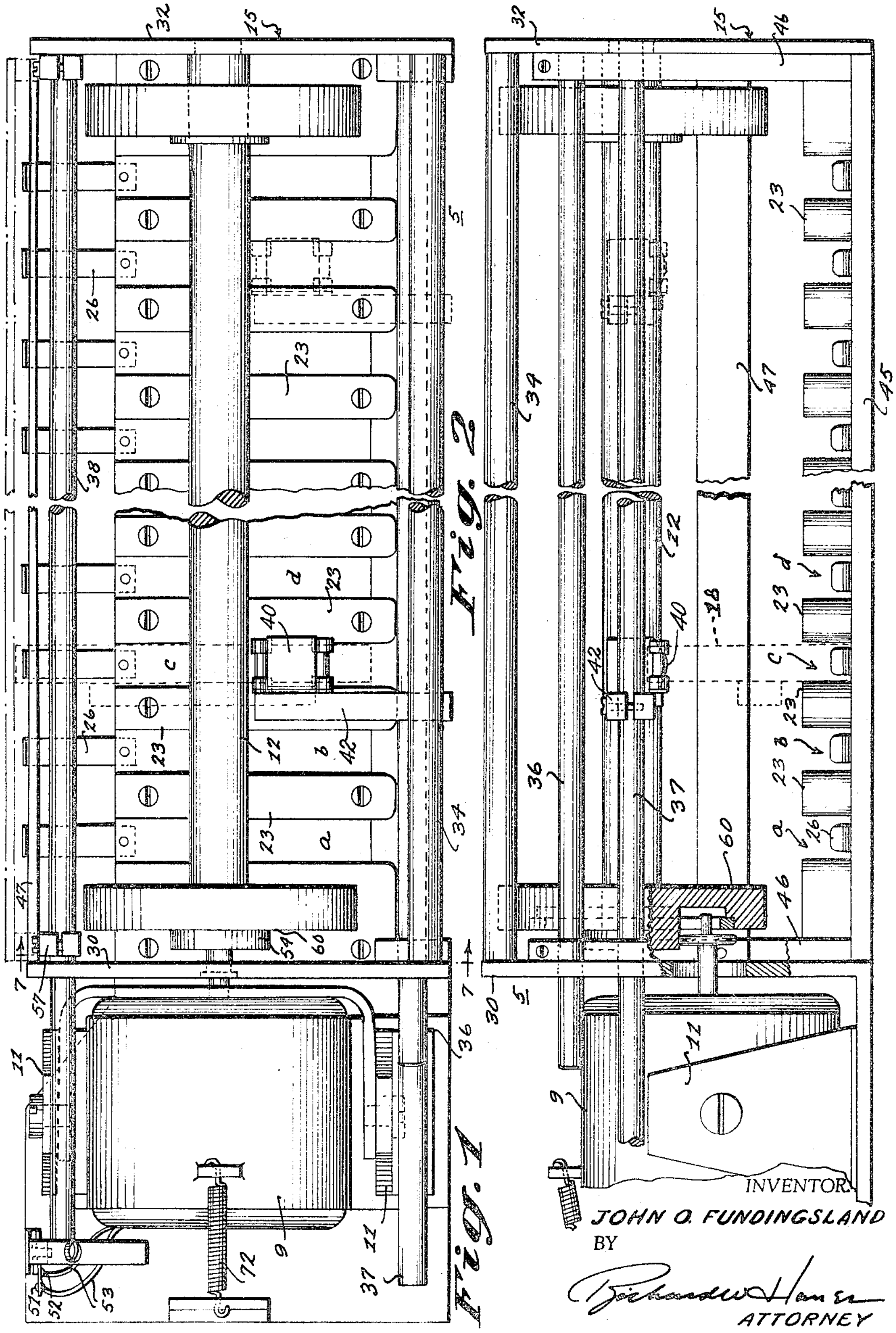
FIGURE 1 is a broken top plan view of the tape cartridge storage and playing apparatus of the present invention.
FIGURE 2 is a side elevational view of the apparatus shown in FIGURE 1 with a section of the motor cut away.

Referring first to FIGURES 1 and 2 where broken plan and elevational views of the tape cartridge holder 5 are shown, it will be seen that a reversible electric motor 9 is mounted to a frame 11 in driving relationship with an overhead capstan 12 which is carried by the cartridge storage rack 15. Across the floor 21 of the rack 15 are a number of spaced apart stub partitions 23 forming a plurality of individual stalls *a*, *b*, *c*, *d*, etc. into which respective tape cartridges 18 may be inserted. The width of each stall is such that the cartridge may be easily inserted and removed by sliding in and out. Extending rearwardly of each stall and in alignment therewith is a raised leaf spring 26 which is provided with a crimp 27 that normally protrudes upwardly to a level higher than the floor of the rack upon which the cartridge rests. The rack is equipped with parallel end walls 30 and 32 that are perpendicular to the floor 21 and which support the ends of a spacer 34 as well as three rigid hanger rods 36, 37 and 38.

Figure 3:
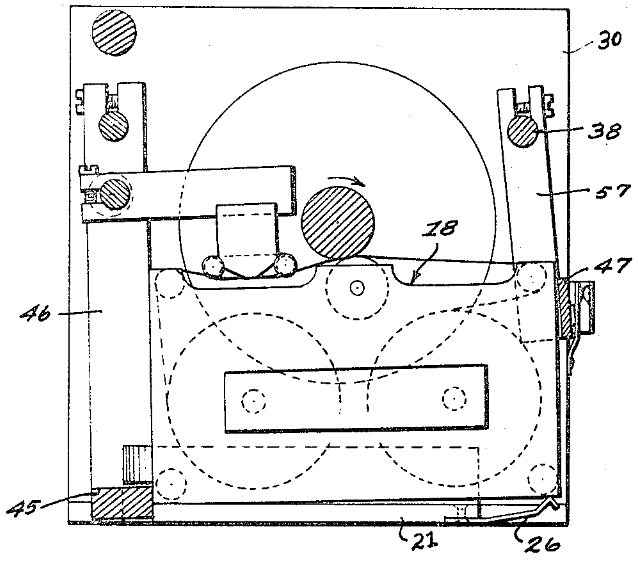
FIGURE 3 is a vertical cross sectional view taken along lines 3—3 in FIGURE 1 and showing a typical tape cartridge in "playing" position.
Figure 4:
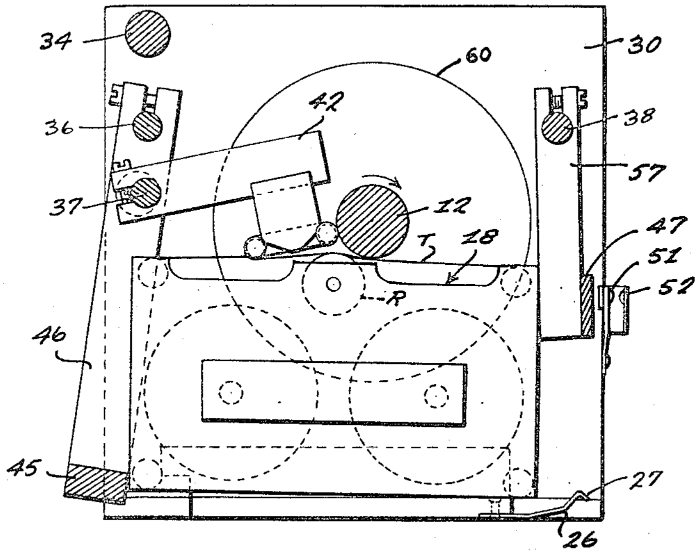
FIGURE 4 is a vertical cross sectional view taken along lines 3—3 in FIGURE 1 and showing a typical tape cartridge in "storage" position.

The remaining structural details and the operation of the apparatus may be more easily explained and understood by relating to a tape cartridge 18 in storage position in a typical one of the stalls *a*, *b*, etc. as illustrated in FIGURE 4. By referring to that drawing, it will be evident that the tape T does not come into contact with the capstan 12 since the cartridge mounted pressure roller R over which the tape T runs is some distance from the capstan periphery. The magnetic head 40 which cooperates with tape T to effectuate an output from or input to the tape is secured to a pivotal arm 42 which is slidably carried by the hanger rod 37. By any convenient mechanical means or by manual operation, the magnetic head supporting arm 42 may be positioned over any tape cartridge which it is desired to operate. When the correct lateral position is achieved, the arm 42 is lowered into "play" position in contact with the tape, as shown in FIGURE 3. In order to bring the tape in contact with the rotatable capstan 12 and to actuate the drive motor 9 to a running condition, the tape cartridge 18 is pressed rearwardly against the crimp 27 in the leaf spring 26 until th rear end of the cartridge 18 has been pushed over the crimp 27 and thereby lifted up by the spring pressure. In the storage position of FIGURE 4, the center lines of the capstan 12 and pressure roller R are in substantial alignment; however, when the cartridge is pushed rearwardly into "play" position where the capstan 12 and roller R are in virtual contact, the roller center passes the vertical center line of the capstan so that the point of mutual contact is ten to twenty degrees to the rear of the capstan vertical center line. Such an arrangment is effective to provide an opposing force to that force of the spring 26 which would tend to push the cartridge out of playing position.

Each cartridge 18 may be selectively injected into playing position, either manually or by a mechanical mechanism which forms no part of this invention, or alternatively all cartridges may be pushed into position at one time. Apparatus for the latter operation may take the form of a swinging bar 45 positioned to be swung by hanger arms 46 into contact with the ends of all cartridges 18 which are within the rack. Group delivery of the cartridges to playing position is only advantageous when it is desired to play all cartridges at one time, which requires a separate magnetic head for each cartridge stall. The phantom magnetic head shown in FIGURES 1 and 2 is typical of the placement and mounting of magnetic heads other than the single head 40.

A switching bar 47 forms a back restraint against which the cartridge is forced as it is pushed into playing position. The bar 47 may be of conductive material and actually form one switch contact, or it may be solely mechanical in its function of closing the motor switch contacts 51 and 52 as it is shown in FIGURE 3. The switch contacts 51 and 52 are connected in a conventional manner by wires 53 to to the electrical connections of the motor 9 and to a suitable source of electrical power so as to turn the motor on when the switch contacts are closed. Switching bar 47 is pivotally attached to the horizontal rod 38 by a pair of spaced apart arms 57 which are loosely mounted on the rod 38 so as to permit swinging movement of the bar 47 in response to pressure exerted by an incoming tape cartridge 18.

Figure 5:
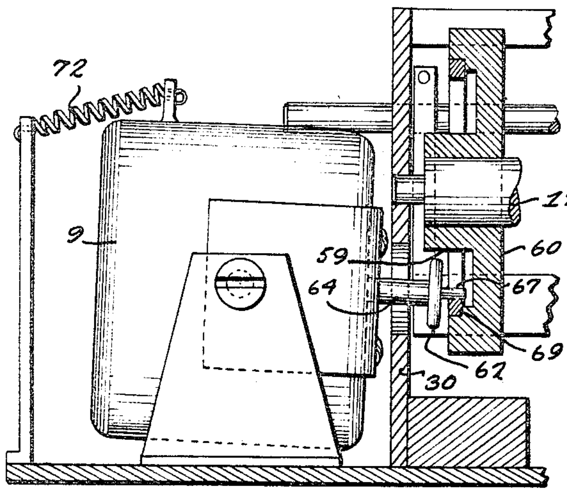
FIGURE 5 is an enlarged fragmentary view with portions broken away and shown in cross section to clearly reveal the details of the driving relationship between the motor and the capstan. The figure depicts the higher speed drive associated with skip and rewind.
Figure 6:
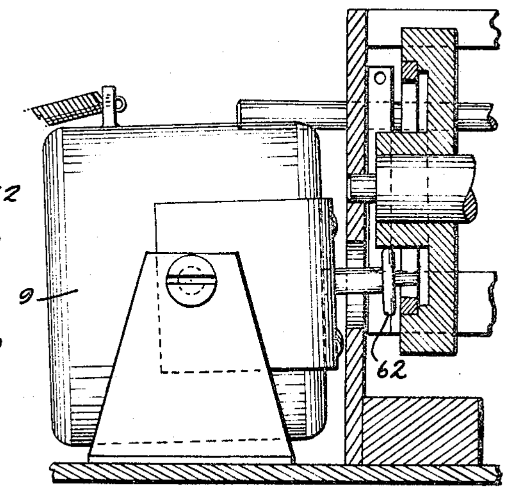
FIGURE 6 is a fragmentary view of the apparatus similar to that shown in FIGURE 5 except that the motor is shown in the drive position associated with "playing" of the tape.
Figure 7:
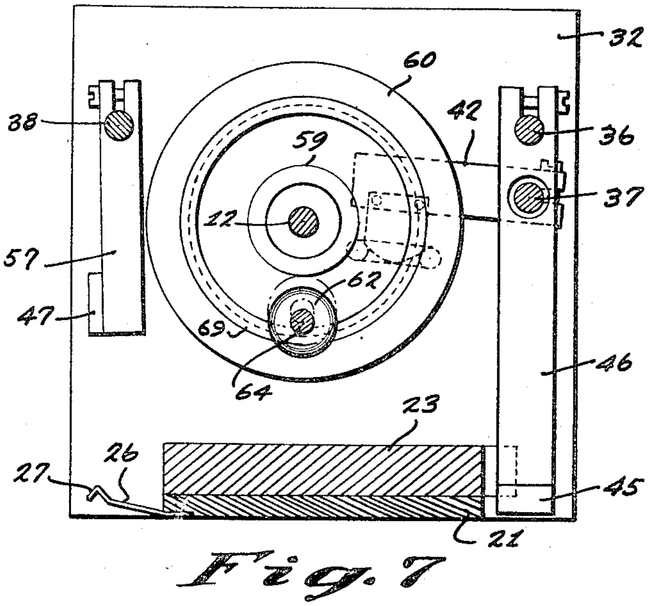
FIGURE 7 is a vertical cross setcion taken along lines 7—7 in FIGURE 1 without any tape cartridge in place in the apparatus.

After the tape cartridge is snapped into playing position and the motor is thereby energized, the capstan 12 may be driven at either of two different speeds with the apparatus illustrated in FIGURES 5 and 6. For playing speed, the hub periphery 59 of a driving drum 60 which is secured to the end of the capstan 12 is adapted to engage the traction surface of a motor driven wheel 62. The diameter of the wheel 62 and hub 52 are dimensioned to provide speed reduction from the motor output shaft 64 necessary for obtaining the appropriate tape drive speed. Faster capstan and tape speeds are desirable for "skip" and "rewind" operations and are available by rocking the motor 9 on its pivotal mounts to bring the reduced diameter end 67 of the output shaft 64 into driving contact with a rubber O ring 69 secured to the inside of a flange on the driving drum 60. In the same manner as with the playing speed wheel 62, the diameter of the end 67 and the diameter of the O ring with respect to the center of the capstan determine the speed of the capstan during the operation shown in FIGURE 5. A tension spring 72 is attached to the motor to bias the motor to a "play" position, it being understood that a manual or mechanical means may be employed to rock the motor forward for faster capstan speeds. Although the electrical details are not specifically illustrated because of their common and well known nature, the motor 9 may be reversed in its direction of rotation by switching to accommodate the requirements for driving the tape T in either of two directions.

The inherent structural aspects of the tape cartridge 18 and of the changer 5 disclosed herein lend themselves to a system of automatic shut-off. Successful use of a cartridge, such as the one described, demands, for obvious reasons, that the ends of the tape T be securely fastened to the spools within the cartridge. When all of the tape has been delivered from the supply spool, the tape which is still being driven by the capstan exerts a pulling force on the spool and cartridge which pulls the cartridge off of the spring 26 and out of engaging contact with the switching bar 47. Without the pressure of a cartridge on the switching bar, the motor switch contacts 51 and 52 open up and the motor is de-energized. The same principle may be applied to reversing the direction of the capstan drive motor instead of turning the motor off. The movement of the cartridge in such a case would only have to be very slight in order to actuate a motor reversing switch.

Figure 8:
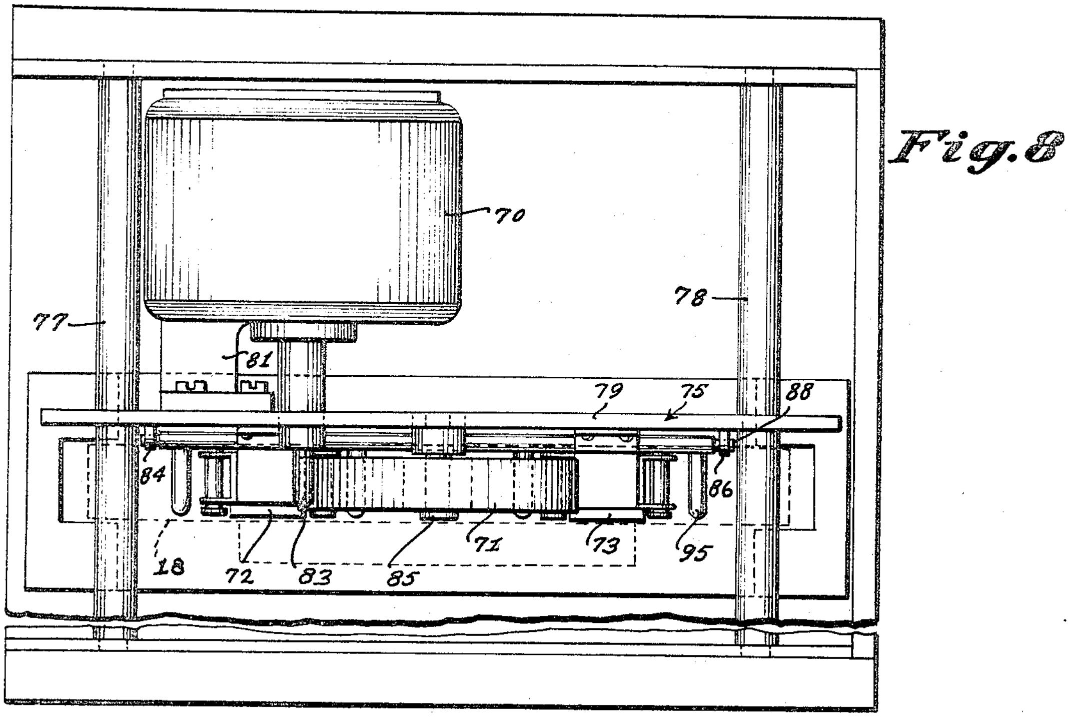
FIGURE 8 is a fragmentary top plan view of a second embodiment of the invention showing the motor and magnetic head carriage.
Figure 9:
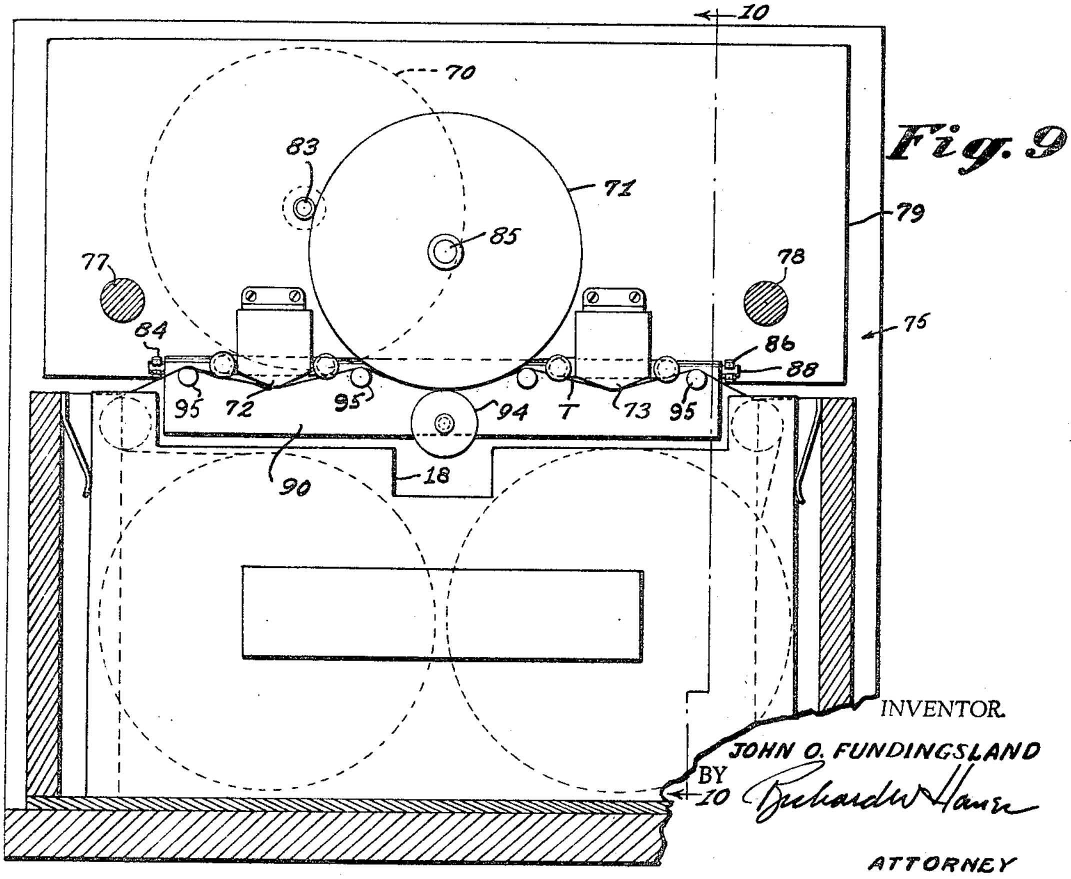
FIGURE 9 is a vertical cross sectional view taken along lines 9—9 of FIGURE 8.
Figure 10:
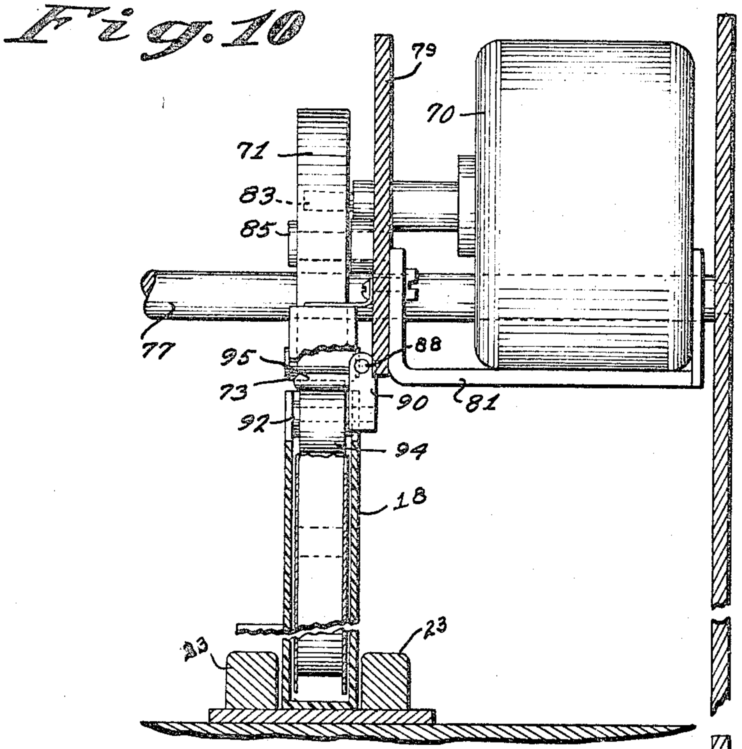
FIGURE 10 is a broken fragmentary side elevational view of the apparatus showing the motor and magnetic head carriage in position over a typical tape cartridge with the magnetic head pivoted downwardly into playing position.

An alternative form of the invention is illustrated in FIGURES 8 through 10 where the drive motor 70, capstan 71 and magnetic heads 72 and 73 are mounted on a movable carriage 75 which is slidable over the length of the rack to be positioned over a specific cartridge 18. Parallel rails 77 and 78 extend between the end walls of the tape rack and are disposed in spaced apertures in a flat frame plate 79 of the carriage 75 in order to carry the same. The motor 70 is attached to the plate 79 by means of a bracket 81 and is positioned so that the motor output shaft 83 protrudes through the plate 79 and makes peripheral driving contact with the capstan wheel 71 which is rotatably mounted on the plate 79 with a spindle 85. A pair of magnetic heads 72 and 73 are secured with brackets to the carriage plate 79 and extend downwardly therefrom to be in a position to contact the magnetic tape T that is within the cartridge 18.

Along the lower margin of the frame plate 79 are disposed a pair of ears 84 and 86 serving to pivotally mount a rod 88 attached securely to a bracket 90 which is designed to pivot with the rod 88 and about its center of rotation. Located centrally of the bracket 90 and rotatably attached thereto by a spindle 92 is a circular pressure roller 94, against which the tape is pressed by the periphery of the capstan 71. Also mounted on the pivotal bracket 90 are a plurality of studs 95 positioned with respect to the magnetic heads so as to form tape guides which will insure an adequate "wrap" of the tape around the gap of the magnetic head to insure against tape flutter.

Figure 11:
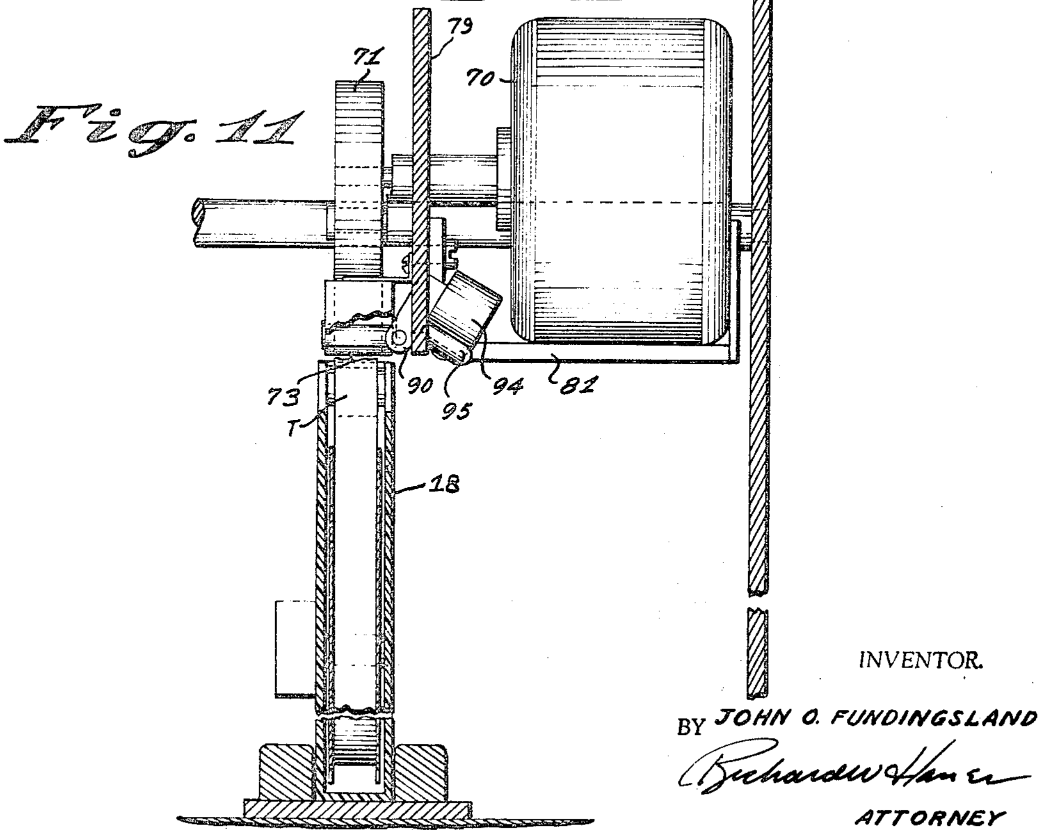
FIGURE 11 is a view similar to FIGURE 10 except that the magnetic head is illustrated in its retracted position.

To move the carriage 75 from one cartridge to another, the bracket 90 is pivoted rearwardly on its hinge forming rod 88 from its FIGURE 10 position to that illustrated in FIGURE 11. Thus with the pressure roller 94 and tape guides 95 out of the way, the carriage is free to be moved along the rails to a subsequent position.

Having thus described the several useful and novel features of the tape cartridge player of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. In apparatus for winding and reeling tape, the combination comprising;

- a housing;
- a pair of spaced apart co-planar tape reels within said housing;
- spindle means attached to the housing and mounting the reels for free rotation;
- a length of tape having its two ends secured to the said two reels respectively;
- a rotatable roller disposed for peripheral contact with the said tape;
- a rotatable capstan in fixed position and having an axis of rotation parallel to the axis of rotation of said pressure roller and disposed for peripheral pressure contact with the said roller at the latter's point of contact with the tape;

a driving motor operatively connected to the capstan;
a source of energy; and
means including switch means interconnecting the source of energy and the motor, said switch means responsive to the position of the housing along a line substantially parallel to the length of the tape.

2. Apparatus for the management of magnetic tape including;
a plurality of tape storage cartridges each having,
a pair of reels supported therein for independent rotation about spaced parallel axes,
a length of tape wound on the reels,
means forming a series of seats for said cartridge to accommodate the cartridges in side-by-side relationship wherein all of the reels are disposed in parallel planes;
elongated capstan means, the rotational axis of which is parallel to the said parallel axes and positioned over the tape of all of said plurality of cartridges at a point intermediate the two reels;
drive means connected with said capstan for providing rotation thereof; and
means forming an inclined plane along the bottom of said seats whereby longitudinal movement of said cartridge along said inclined plane will elevate said cartridge a distance sufficient to bring the tape therein into engagement with the said capstan.

3. An apparatus for winding and reeling tape, the combination comprising:
a rack having a plurality of side-by-side seating means for holding tape cartridges;
at least one tape cartridge including,
a housing,
a pair of spaced co-planar reels,
a spindle means attached to the housing and mounting the reels for free rotation;
a length of tape wound at least in part on each of the two reels, the ends of said tape secured to the two reels respectively;
a pressure roller carried by the housing and disposed in peripheral contact with the tape;
a capstan carried by the rack and disposed for rotation about an axis perpendicular to the plane of rotation of the said reels;
drive means carried by the rack and having an output operatively connected to the capstan; and
means to actuate the drive means, said actuator means responsive to the position of the cartridge within its respective seat as measured along a line substantially parallel with the length of the tape.

4. An apparatus for winding and reeling tape, the combination comprising;
a rack having a plurality of side-by-side seating means for holding tape cartridges;
at least one tape cartridge including,
a housing,
a pair of spaced co-planar reels, spindle means attached to the housing and mounting the reels for free rotation;
a length of tape wound at least in part on each of the two reels, the ends of said tape secured to the two reels respectively;
a pressure roller carried by the housing and disposed in peripheral contact with the tape;
a capstan carried by the rack and disposed for rotation about an axis perpendicular to the plane of rotation of the said reels;
a motor having an output shaft with a reduced diameter end portion;
a drive wheel having a hub and a peripheral flange, said drive wheel mounted on the capstan for rotation therewith; and
means mounting the drive motor for swivel motion, said mounting means disposed with respect to the drive wheel so that the larger diameter portion of the motor output shaft contacts the periphery of the said hub and the smaller diameter end of the output shaft contacts the inside periphery of the said flange alternately upon swivel motion of the motor.

5. Apparatus for winding and reeling tape comprising;
seating means for at least one tape cartridge;
a rotatable capstan disposed above said seating means;
a drive wheel having a hub and a peripheral flange, said drive wheel mounted on the capstan for rotation therewith;
drive means with a rotatable output shaft having a large diameter portion and a small diameter portion;
means rotatively mounting said drive means for swivel movement about an axis perpendicular to the said output shaft, said mounting means being disposed with respect to said drive wheel so that said large diameter portion of said shaft will contact said hub in one angular position of said drive means and the small diameter portion will contact the said flange in a second angular position of said drive means.

6. Apparatus for winding and reeling tapes comprising;
means forming a seat for a tape cartridge having a length of tape therein;
means including a rotatable capstan disposed above said seat and adapted to make tangential contact with said tape when the cartridge is in said seat;
drive means operatively connected to the capstan;
switch means for controlling the operation of the drive means, said switch means responsive to a change of cartridge position along a line substantially coincident with the longitudinal axis of the tape at its point of tangency with the capstan.

References Cited

UNITED STATES PATENTS

| | | | |
|---|---|---|---|
| 2,821,576 | 1/1958 | Gaubert. | |
| 3,027,112 | 3/1962 | Flan | 242—55.19 X |

LEONARD D. CHRISTIAN, *Primary Examiner.*